(12) United States Patent
Si et al.

(10) Patent No.: US 11,758,503 B2
(45) Date of Patent: Sep. 12, 2023

(54) METHOD AND DEVICE FOR CONFIGURING AND RECEIVING POSITIONING REFERENCE SIGNAL

(71) Applicant: VIVO MOBILE COMMUNICATION CO., LTD., Chang'an Dongguan (CN)

(72) Inventors: Ye Si, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 175 days.

(21) Appl. No.: 17/137,639

(22) Filed: Dec. 30, 2020

(65) Prior Publication Data

US 2021/0120519 A1   Apr. 22, 2021

Related U.S. Application Data

(63) Continuation of application No. PCT/CN2019/094515, filed on Mar. 7, 2019.

(30) Foreign Application Priority Data

Jul. 6, 2018   (CN) .......................... 201810738246.7

(51) Int. Cl.
*H04W 64/00* (2009.01)
*H04W 56/00* (2009.01)
(Continued)

(52) U.S. Cl.
CPC ........ *H04W 64/003* (2013.01); *H04B 7/0626* (2013.01); *H04L 5/0048* (2013.01);
(Continued)

(58) Field of Classification Search
CPC ....... H04B 7/088; H04B 7/0617; H04W 8/22; H04W 72/005; H04W 72/046; H04W 24/10; G01S 1/20; G01S 5/10
See application file for complete search history.

(56) References Cited

U.S. PATENT DOCUMENTS

2013/0194931 A1   8/2013   Lee et al.
2015/0382318 A1  12/2015   Kim et al.
(Continued)

FOREIGN PATENT DOCUMENTS

CN   106576009 A   4/2017
EP   3796586 A1   3/2021
(Continued)

OTHER PUBLICATIONS

Japanese Notice of Reasons for Refusal for related Application No. 2021-521871; dated Feb. 9, 2022.
(Continued)

*Primary Examiner* — Yee F Lam
(74) *Attorney, Agent, or Firm* — von Briesen & Roper, s.c.

(57) ABSTRACT

A method and a device for configuring a positioning reference signal and a method and a device for receiving the positioning reference signal are provided. The method for configuring the positioning reference signal includes: transmitting configuration information based on a spatial quasi co-location QCL relationship between a positioning reference signal PRS and a specific downlink signal, where the configuration information is used to determine a resource occupied by the PRS and the specific downlink signal.

20 Claims, 4 Drawing Sheets

Transmitting configuration information based on a spatial quasi co-location QCL relationship between the positioning reference signal PRS and a specific downlink signal, where the configuration information is used to determine a resource occupied by the PRS and the specific downlink signal — S101

Transmitting the PRS and the specific downlink signal based on the configuration information — S102

(51) Int. Cl.
*H04W 72/00* (2023.01)
*H04B 7/06* (2006.01)
*H04L 5/00* (2006.01)
*H04W 72/30* (2023.01)

(52) U.S. Cl.
CPC ........ *H04W 56/001* (2013.01); *H04W 72/30* (2023.01); *H04L 5/0007* (2013.01)

(56) References Cited

U.S. PATENT DOCUMENTS

| | | | |
|---|---|---|---|
| 2017/0207891 A1 | 7/2017 | Yi et al. | |
| 2017/0289831 A1* | 10/2017 | Park | G01S 5/02 |
| 2018/0007576 A1* | 1/2018 | Lee | H04W 24/10 |
| 2018/0270784 A1 | 9/2018 | Lee et al. | |
| 2019/0369201 A1* | 12/2019 | Akkarakaran | G01S 1/0428 |
| 2019/0394634 A1* | 12/2019 | Akkarakaran | H04B 7/0617 |
| 2019/0394747 A1* | 12/2019 | Akkarakaran | H04W 56/001 |
| 2020/0092737 A1* | 3/2020 | Siomina | H04W 36/06 |
| 2020/0128412 A1* | 4/2020 | Kazmi | H04B 7/088 |
| 2020/0267571 A1* | 8/2020 | Park | H04W 72/0446 |
| 2020/0389883 A1* | 12/2020 | Faxér | H04L 5/0025 |

FOREIGN PATENT DOCUMENTS

| | | |
|---|---|---|
| JP | 2015508956 A | 3/2015 |
| WO | 2017034182 A1 | 3/2017 |

OTHER PUBLICATIONS

Extended Search Report for related Application No. 19830906.4; dated Jun. 29, 2021.
Intel Corporation, "Summary for AI 7.2.10.1—DL Reference Signals for NR Positioning", Apr. 8-12, 2019, 3GPP Tsg Ran WG1 Meeting #96bis, Xi'an, China.
Indian first Office Action for related Application No. 20217004147; dated Nov. 21, 2022.
Intel Corporation, "CRS awareness on CRS+PRS for OTDOA", Nov. 14-18, 2016, 3GPP TSG RAN WG1 Meeting #87, Reno, USA.

* cited by examiner

Transmitting configuration information based on a spatial quasi co-location QCL relationship between the positioning reference signal PRS and a specific downlink signal, where the configuration information is used to determine a resource occupied by the PRS and the specific downlink signal — S101

Fig. 1

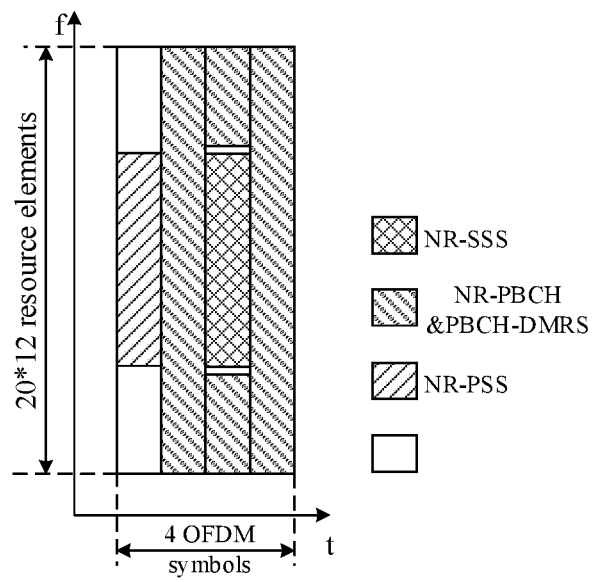

Fig. 2

Transmitting configuration information based on a spatial quasi co-location QCL relationship between the positioning reference signal PRS and a specific downlink signal, where the configuration information is used to determine a resource occupied by the PRS and the specific downlink signal — S101

Transmitting the PRS and the specific downlink signal based on the configuration information — S102

Fig. 3

METHOD AND DEVICE FOR CONFIGURING AND RECEIVING POSITIONING REFERENCE SIGNAL

CROSS-REFERENCE TO RELATED APPLICATION

The present application is a continuation application of PCT Application No. PCT/CN2019/094515 filed on Jul. 3, 2019, which claims a priority to the Chinese patent application No. 201810738246.7 filed in China on Jul. 6, 2018, a disclosure of which is incorporated herein by reference in its entirety.

TECHNICAL FIELD

The present disclosure relates to the field of communication technology, in particular to a method and a device for configuring a positioning reference signal and a method and a device for receiving the positioning reference signal.

BACKGROUND

In a long term evolution (LTE) system, a positioning reference signal (PRS) can only be transmitted in a resource block in a downlink subframe configured for positioning reference signal transmission. The PRS cannot be mapped to a resource element (RE) allocated to a physical broadcast channel PBCH), primary synchronization signal (PSS) and secondary synchronization signal (SSS), and the PRS does not overlap with any cell-specific reference signal of an antenna port.

However, in a new radio (NR) system, it is not clear how a network device configures a PRS. Thus, user equipment (UE) cannot receive a PRS properly, and further cannot perform positioning based on the PRS. Taking a NR system for example, the present disclosure describes configuration of such matter. However, the present disclosure is not limited to the NR system.

SUMMARY

Embodiments of the present disclosure provide a method and a device for configuring a positioning reference signal and a method and a device for receiving the positioning reference signal, so as to solve the problem that UE cannot receive a PRS properly, and further cannot perform positioning based on the PRS.

In a first aspect, a method for configuring a positioning reference signal is provided. The method is applied to a network device and includes:

transmitting configuration information based on a spatial quasi co-location QCL relationship between the positioning reference signal PRS and a specific downlink signal, where the configuration information is used to determine a resource occupied by the PRS and the specific downlink signal;

where the specific downlink signal includes one or more of following signals: a channel state information reference signal CSI-RS, a physical downlink shared channel PDSCH, a physical downlink control channel PDCCH and a synchronization signal block SSB.

In a second aspect, a method for receiving a positioning reference signal is provided. The method is applied to a terminal device and includes:

receiving configuration information, where the configuration information is transmitted by a network device based on a spatial quasi co-location QCL relationship between the positioning reference signal PRS and a specific downlink signal, and the configuration information is used to determine a resource occupied by the PRS and the specific downlink signal;

where the specific downlink signal includes one or more of following signals: a channel state information reference signal CSI-RS, a physical downlink shared channel PDSCH, a physical downlink control channel PDCCH and a synchronization signal block SSB.

In a third aspect, a network device is provided. The network device includes:

a first transmission module, configured to transmit configuration information based on a spatial quasi co-location QCL relationship between a positioning reference signal PRS and a specific downlink signal, where the configuration information is used to determine a resource occupied by the PRS and the specific downlink signal;

where the specific downlink signal includes one or more of following signals: a channel state information reference signal CSI-RS, a physical downlink shared channel PDSCH, a physical downlink control channel PDCCH and a synchronization signal block SSB.

In a fourth aspect, a terminal device is provided. The terminal device includes:

a first reception module, configured to receive configuration information, where the configuration information is transmitted by a network device based on a spatial quasi co-location QCL relationship between a positioning reference signal PRS and a specific downlink signal, and the configuration information is used to determine a resource occupied by the PRS and the specific downlink signal;

where the specific downlink signal includes one or more of following signals: a channel state information reference signal CSI-RS, a physical downlink shared channel PDSCH, a physical downlink control channel PDCCH and a synchronization signal block SSB.

In a fifth aspect, a network device is provided. The network device includes a memory, a processor and a wireless communication program stored in the memory and configured to be executed by the processor, where the processor is configured to execute the wireless communication program to implement steps of the method described in the first aspect.

In a sixth aspect, a terminal device is provided. The terminal device includes a memory, a processor and a wireless communication program stored in the memory and configured to be executed by the processor, where the processor is configured to execute the wireless communication program to implement steps of the method described in the second aspect.

In a seventh aspect, a computer readable medium is provided. The computer readable medium stores therein a wireless communication program, where the wireless communication program is configured to be executed by a processor to implement steps of the method described in the first or second aspect.

In embodiments of the present disclosure, due to the configuration information transmitted by the network device for determining the resource occupied by the PRS and the specific downlink signal, the terminal device may determine whether the PRS and the specific downlink signal are multiplexed on downlink time-domain resources, so as to receive the PRS properly, and further perform positioning of the terminal device according to a received PRS, thereby improving communication effectiveness.

BRIEF DESCRIPTION OF THE DRAWINGS

To better clarify technical solutions of embodiments of the present disclosure or technical solutions in the related art, drawings used in descriptions of the embodiments or the related art are briefly introduced hereinafter. Apparently, the drawings described below merely illustrate some embodiments set forth in the present disclosure. A person of ordinary skill in the art can obtain other drawings based on these drawings without any creative efforts.

FIG. 1 is a first schematic flow diagram of a method for configuring a positioning reference signal according to an embodiment of the present disclosure;

FIG. 2 is a schematic diagram of an SSB resource mapping structure according to an embodiment of the present disclosure;

FIG. 3 is a second schematic flow diagram of a method for configuring a positioning reference signal according to an embodiment of the present disclosure;

DETAILED DESCRIPTION

Figure 4:
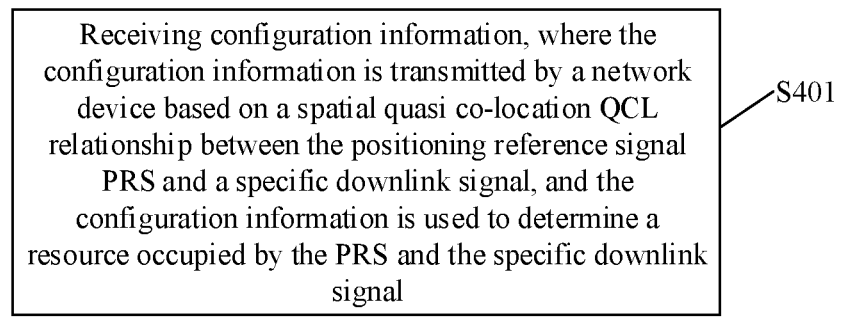
FIG. 4 is a first schematic flow diagram of a method for receiving a positioning reference signal according to an embodiment of the present disclosure.

To facilitate a better understanding of the technical solutions of the present disclosure by those skilled in the art, the following describes clearly and completely the technical solutions according to embodiments of the present disclosure with reference to the accompanying drawings in the embodiments of the present disclosure. It is apparent embodiments in the following description are merely a part rather than all of the embodiments of the present disclosure. All other embodiments obtained by a person of ordinary skill in the art based on the embodiments of the present disclosure without creative efforts shall fall within the scope of the present disclosure.

It is understood, technical solutions in embodiments of the present disclosure may be applied to various communication systems, such as a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunication system (UMTS) or a worldwide interoperability for microwave access (WiMAX) communication system, a 5G or new radio (NR) system.

User equipment (UE), also called mobile terminal (Mobile Terminal), mobile terminal device, etc., may communicate with one or more core networks via a radio access network (e.g., RAN). The user equipment may be a mobile terminal, e.g., a mobile phone (or cellular phone) or a computer provided with a mobile terminal, such as a portable, pocket-sized, handheld, computer built-in or in-vehicle mobile apparatus, which exchanges voice and/or data with the radio access network.

A network device is an apparatus deployed in a radio access network and configured to provide a positioning reference signal configuration function for terminal devices. The network device may be a base station. The base station may be a base station (Base Transceiver Station, BTS) in GSM or CDMA, or may be a base station (NodeB) in WCDMA, or may be an evolved base station (evolutional Node B, eNB or eNodeB) in LTE or a 5G base station (gNB), or a location server (Evolved Serving Mobile Location Center, E-SMLC) in LTE and a location server (Location Management Function, LMF) in 5G, and a network side device in a subsequent evolved communication system, however the nomenclature does not constitute a limitation on the scope of the present disclosure.

It is noted, in describing a specific embodiment, the numbering of various processes is not intended to imply an execution sequence. The execution sequence of the processes should be determined in accordance with the functions and inherent logic thereof, and by no means constitutes any limitation on the implementation of the embodiments of the present disclosure.

It is noted, the method and the device for configuring a positioning reference signal and the method and the device for receiving the positioning reference signal are described hereinafter by taking a NR system for example. However, it is understood, the method and the device for configuring a positioning reference signal and the method and the device for receiving the positioning reference signal provided in embodiments of the present disclosure are also applicable to other communication systems, and are not limited to the NR system.

Hereinafter, a method for configuring a positioning reference signal that is applied to a network device is described with reference to FIG. 1 to FIG. 3.

FIG. 1 illustrates a method for configuring a positioning reference signal according to an embodiment of the present disclosure that is applied to a network device. As shown in FIG. 1, the method may include following step:

Step 101: Transmitting configuration information based on a spatial quasi co-location QCL relationship between the positioning reference signal PRS and a specific downlink signal, where the configuration information is used to determine a resource occupied by the PRS and the specific downlink signal.

The specific downlink signal includes a downlink system common signal or a system common channel. For example, the specific downlink signal includes one or more of following signals: a channel state information reference signal (CSI-RS), a physical downlink shared channel (PDSCH), a physical downlink control channel (PDCCH) and a synchronization signal block (SSB), among other system common signals or system common channels.

The following briefly introduces quasi co-location (QCL) relationships.

In specific, in a case that signals of two antenna ports satisfy a QCL relationship, the two groups of signals have approximately the same experience in regard to at least one of a channel Doppler shift, a channel Doppler spread, an channel average delay, a channel delay spread and a channel spatial reception parameter. There may be the following types of QCL relationships:

QCL type A (QCL-TypeA): {a Doppler shift, a Doppler spread, an average delay, a delay spread};

QCL type B (QCL-TypeB): {a Doppler shift, a Doppler spread};

QCL type C (QCL-TypeC): {an average delay, a Doppler shift};

QCL type D (QCL-TypeD): {a spatial Rx parameter}.

Generally speaking, in a case that there is a spatial QCL relationship between the PRS and the specific downlink signal, the configuration information includes: the PRS and the specific downlink signal may occupy a same (or one and the same) orthogonal frequency division multiplexing (OFDM) symbol. Certainly, in a case that there is a spatial QCL relationship between the PRS and the specific downlink signal, the configuration information may include: the PRS and the specific downlink signal may occupy different OFDM symbols. In a case that there is no spatial QCL relationship between the PRS and the specific downlink signal, the configuration information includes: the PRS and the specific downlink signal occupy different OFDM symbols. Resources occupied by the PRS and the specific downlink signal are described in detail with respect to more specific embodiments below.

It is understood, configuring, by the network device, the PRS and the specific downlink signal to occupy the same OFDM symbol or to occupy different OFDM symbols is intended to make configuration so that the PRS and the specific downlink signal are multiplexed onto downlink time-domain resources or not multiplexed onto downlink time-domain resources, that is, make configuration as to whether to avoid a collision between the PRS and the specific downlink signal.

In the method for configuring the positioning reference signal according to the embodiment of the present disclosure, due to the configuration information transmitted by the network device for determining the resource occupied by the PRS and the specific downlink signal, the terminal device may determine whether the PRS and the specific downlink signal are multiplexed on downlink time-domain resources, so as to receive the PRS properly, and further perform positioning of the terminal device according to a received PRS, thereby improving communication effectiveness.

Contents included in the configuration information transmitted by the network device are described with respect to more specific embodiments below.

In an embodiment, it is assumed that the specific downlink signal includes the CSI-RS.

As an example, in a case that there is a spatial QCL relationship between the PRS and the CSI-RS, the configuration information includes: the PRS and the CSI-RS occupy a same orthogonal frequency division multiplexing OFDM symbol. In other words, the PRS and the CSI-RS may be multiplexed onto the same time-domain resource, which means the terminal device may receive the PRS and the CSI-RS simultaneously.

In specific, that the PRS and the CSI-RS occupy the same orthogonal frequency division multiplexing OFDM symbol may include: the PRS and the CSI-RS are frequency division multiplexed on different resource elements RE in the same OFDM symbol; or in a case that the PRS and the CSI-RS are transmitted on a same RE in the OFDM symbol, the PRS and the CSI-RS share the same RE.

As another example, in a case that there is no spatial QCL relationship between the PRS and the CSI-RS, the configuration information includes: the PRS and the CSI-RS occupy different OFDM symbols. In other words, the PRS and the CSI-RS are not multiplexed onto the same time-domain resource, which means the terminal device receives either the PRS or the CSI-RS at the same time.

In the above two examples, the CSI-RS may include one or more of following information: (1) a CSI-RS for tracking (CSI-RS for tracking), e.g., a tracking reference signal (TRS); (2) a CSI-RS for physical layer (L1) reference signal received power (RSRP) computation, i.e., a CSI-RS for L1-RSRP computation; (3) a CSI-RS for mobility (CSI-RS for mobility), or the like.

In this embodiment, due to the configuration information transmitted by the network device for determining the resource occupied by the PRS and the CSI-RS, the terminal device may determine whether the PRS and the CSI-RS are multiplexed on downlink time-domain resources, so as to receive the PRS properly, and further perform positioning of the terminal device according to a received PRS, thereby improving communication effectiveness.

In another embodiment, it is assumed that the specific downlink signal includes the PDSCH.

As an example, in a case that there is a spatial QCL relationship between the PRS and the PDSCH, the configuration information includes: the PRS and the PDSCH occupy a same orthogonal frequency division multiplexing OFDM symbol, which means the PRS and the PDSCH may be multiplexed onto the same time-domain resource. The network device may transmit the PRS and the PDSCH in the same OFDM symbol, and correspondingly, the terminal device may receive the PRS and the PDSCH simultaneously.

In this example, that the PRS and the PDSCH occupy the same OFDM symbol may specifically include: the PDSCH is rate matched around the PRS, or in a case that the PRS and the PDSCH are transmitted on a same RE in the OFDM symbol, the PDSCH mapped to the RE is punctured by the PRS (PDSCH are punctured by PRS).

That the PDSCH mapped to the RE is punctured by the PRS refers to the PDSCH mapped to the RE is removed and the PRS is mapped to the RE.

That the PDSCH is rate matched around the PRS refers to the PRS is mapped to the RE, and the PDSCH is mapped to a RE other than that occupied by the PRS.

As another example, in a case that there is a spatial QCL relationship between the PRS and the PDSCH, the configuration information may also include: the PRS and the PDSCH occupy different OFDM symbols. That the PRS and the PDSCH occupy different OFDM symbols may specifically include: the PRS and the PDSCH occupy different OFDM symbols in the same slot; or the PRS and the PDSCH occupy OFDM symbols in different slots, i.e., the PDSCH is not transmitted in a slot used for PRS transmission.

It means that, in a case that there is a spatial QCL relationship between the PRS and the PDSCH, the PRS and the PDSCH may not be multiplexed on the same time-domain resource. The network device transmits the PRS only and does not transmit the PDSCH in one or more OFDM symbols, and correspondingly, the terminal device only receives the PRS at the same time.

As still another example, in a case that there is no spatial QCL relationship between the PRS and the PDSCH, the configuration information includes: the PRS and the PDSCH occupy different OFDM symbols, which means the PRS and the PDSCH are not multiplexed onto the same time-domain resource. The network device transmits the PRS only and does not transmit the PDSCH in one or more OFDM symbols, or the network device transmits the PDSCH only and does not transmit the PRS in one or more OFDM symbols. Correspondingly, the terminal device only receives the PRS or the PDSCH at the same time.

In this embodiment, due to the configuration information transmitted by the network device for determining the resource occupied by the PRS and the PDSCH, the terminal device may determine whether the PRS and the PDSCH are multiplexed on downlink time-domain resources, so as to receive the PRS properly, and further perform positioning of the terminal device according to a received PRS, thereby improving communication effectiveness.

In another embodiment, it is assumed that the specific downlink signal includes the PDCCH.

As an example, in a case that there is a spatial QCL relationship between the PRS and the PDCCH, the configuration information includes: the PRS and the PDCCH occupy a same orthogonal frequency division multiplexing OFDM symbol, which means the PRS and the PDCCH may be multiplexed onto the same time-domain resource. The network device may transmit the PRS and the PDCCH in the same OFDM symbol, and correspondingly, the terminal device may receive the PRS and the PDCCH simultaneously.

In this example, that the PRS and the PDCCH occupy the same OFDM symbol may specifically include: the PDCCH is rate matched around the PRS, or in a case that the PRS and the PDCCH are transmitted on a same RE in the OFDM symbol, the PDCCH mapped to the RE is punctured by the PRS.

That the PDCCH mapped to the RE is punctured by the PRS refers to the PDCCH mapped to the RE is removed and the PRS is mapped to the RE.

That the PDCCH is rate matched around the PRS refers to the PRS is mapped to the RE, and the PDCCH is mapped to a RE other than that occupied by the PRS.

Or, as another example, in a case that there is a spatial QCL relationship between the PRS and the PDCCH, the configuration information may also include: the PRS and the PDCCH occupy different OFDM symbols, which means in a case that there is a spatial QCL relationship between the PRS and the PDCCH, the PRS and the PDCCH may not be multiplexed on the same time-domain resource. The network device may make configuration so that the PRS is not transmitted in an OFDM symbol occupied by the PDCCH, and correspondingly, the terminal device does not receive the PRS in the OFDM symbol occupied by the PDCCH at the same time.

As still another example, in a case that there is no spatial QCL relationship between the PRS and the PDCCH, the configuration information includes: the PRS and the PDCCH occupy different OFDM symbols, which means the PRS and the PDCCH are not multiplexed onto the same time-domain resource when there is no spatial QCL relationship between the PRS and the PDCCH. The network device may make configuration so that the PRS is not transmitted in the OFDM symbol occupied by the PDCCH, and correspondingly, the terminal device only receives the PDCCH at the same time.

In this embodiment, due to the configuration information transmitted by the network device for determining the resource occupied by the PRS and the PDCCH, the terminal device may determine whether the PRS and the PDCCH are multiplexed on downlink time-domain resources, so as to receive the PRS properly, and further perform positioning of the terminal device according to a received PRS, thereby improving communication effectiveness.

In another embodiment, it is assumed that the specific downlink signal includes an SSB.

As an example, in a case that there is a spatial QCL relationship between the PRS and the SSB, and the PRS and the SSB have a same subcarrier spacing, the configuration information includes: the PRS and the SSB occupy a same orthogonal frequency division multiplexing OFDM symbol.

In this example, the PRS and the SSB are configured by the network device to occupy the same OFDM symbol in one of following manners.

(1) The PRS and the physical broadcast channel PBCH in the SSB occupy resource blocks (RB) at different frequency-domain positions in the OFDM symbol, in other words, a frequency domain position occupied by the PRS in the OFDM symbol is on resource blocks RBs external to RBs occupied by the physical broadcast channel PBCH in the SSB.

The SSB may include signals such as a primary synchronization signal (PSS), a secondary synchronization signal (SSS), a physical broadcast channel (PBCH) and a physical broadcast channel-demodulation reference signal (PBCH-DMRS).

This manner may refer, in an extended meaning, to: the PRS and the SSB occupy RBs at different frequency-domain positions in the same OFDM symbol. For example, refer to FIG. 2, in which a schematic diagram of a resource mapping structure in four OFDM symbols is illustrated. As shown in FIG. 2, NR-PSS, NR-SSS, NR-PBCH and NR-PBCH-DMRS are mapped to the four OFDM symbols, and the four OFDM symbols include in total 20 RBs occupied by the SSB. The network device may dispose the PRS to a RB external to the 20 RBs. The PRS is disposed to the RB external to the 20 RBs, even if the first OFDM symbol is not fully occupied by the SSB (unpatterned portions in FIG. 2). In the example as shown in FIG. 2, one RB may include twelve consecutive subcarriers.

(2) In a case that the PRS and the SSB are transmitted on a same RE in the OFDM symbol, the PRS mapped to the RE is punctured by the SSB.

That is, the PRS and the SSB may be configured by the network device to occupy the same OFDM symbol; in a case that the PRS and the SSB are transmitted on a same RE in the OFDM symbol, the PRS mapped to the RE is removed and the SSB is mapped to the RE.

(3) In a case that the PRS and the SSB are transmitted on a same RE in the OFDM symbol, the SSB mapped to the RE is punctured by the PRS.

That is, the PRS and the SSB may be configured by the network device to occupy the same OFDM symbol; in a case that the PRS and the SSB are transmitted on a same RE in the OFDM symbol, the SSB mapped to the RE is removed and the PRS is mapped to the RE.

(4) In a case that the PRS and a physical broadcast channel demodulation reference signal PBCH DMRS in the SSB are transmitted on a same RE in the OFDM symbol, the PRS and the PBCH DMRS share the RE, and in a case that the PRS and an SSB other than the PBCH DMRS are transmitted on a same RE in the OFDM symbol, the PRS mapped to the RE is punctured by the SSB other than the PBCH DMRS.

That is, the PRS and the SSB may be configured by the network device to occupy the same OFDM symbol; in a case that the PRS and the PBCH DMRS in the SSB are transmitted on a same RE in the OFDM symbol, the PRS and the PBCH DMRS share the RE, and in a case that the PRS and an SSB other than the PBCH DMRS are transmitted on a same RE in the OFDM symbol, the PRS mapped to the RE is removed and the SSB other than the PBCH DMRS is mapped to the RE.

(5) In a case that the PRS and a physical broadcast channel demodulation reference signal PBCH DMRS in the SSB are transmitted on a same RE in the OFDM symbol, the PRS and the PBCH DMRS share the RE, and in a case that the PRS and an SSB other than the PBCH DMRS are transmitted on a same RE in the OFDM symbol, the SSB other than the PBCH DMRS that is mapped to the RE is punctured by the PRS.

That is, the PRS and the SSB may be configured by the network device to occupy the same OFDM symbol; in a case that the PRS and the PBCH DMRS in the SSB are transmitted on a same RE in the OFDM symbol, the PRS and the PBCH DMRS share the RE, and in a case that the PRS and an SSB other than the PBCH DMRS are transmitted on a same RE in the OFDM symbol, the SSB other than the PBCH DMRS that is mapped to the RE is removed and the PRS is mapped to the RE.

Or, as another example, in a case that there is a spatial QCL relationship between the PRS and the SSB, the configure information includes: the PRS and the SSB occupy different OFDM symbols, which means the network device configures that the PRS is not to be transmitted in the OFDM symbol occupied by the SSB.

As still another example, in a case that there is no spatial QCL relationship between the PRS and the SSB, the configuration information includes: the PRS and the SSB occupy different OFDM symbols. In other words, in a case that there is no spatial QCL relationship between the PRS and the SSB, the network device configures that the PRS is not to be transmitted in the OFDM symbol occupied by the SSB, and the terminal device only receives the SSB.

In this embodiment, due to the configuration information transmitted by the network device for determining the resource occupied by the PRS and the SSB, the terminal device may determine whether the PRS and the SSB are multiplexed on downlink time-domain resources, so as to receive the PRS properly, and further perform positioning of the terminal device according to a received PRS, thereby improving communication effectiveness.

The above describes resource occupancy configurations of PRS and CSI-RS, PRS and PDSCH, PRS and PDCCH, and PRS and SSB respectively with respect to specific embodiments. The manner of transmitting the configuration information by the network device is described hereinafter.

In a specific configuration process, the network device may transmit the configuration information by one or more of following means: (1) transmitting the configuration information based on higher layer signaling, e.g., by using a radio resource control (RRC) message; (2) transmitting the configuration information based on media access control (MAC) layer signaling; or (3) transmitting the configuration information based on downlink control information (DCI).

Certainly, in another embodiment, the aforementioned configuration information may be specified by a protocol. It is understood, in a case that the configuration information is specified by a protocol, the network device may not transmit the configuration information. Instead, the terminal device acquires the configuration information by querying a protocol and receives the PRS based on the configuration information.

Optionally, in another embodiment, as shown in FIG. 3, on the basis of the aforementioned step 101, the method for configuring a positioning reference signal according to an embodiment of the present disclosure may further include:

Step 102: transmitting the PRS and the specific downlink signal based on the configuration information.

It is understood, after the configuration information is transmitted to the terminal device, the PRS and the specific downlink signal are subsequently transmitted to the terminal device based on the configuration information. In this way, the terminal device may receive the PRS and the specific downlink signal properly and perform subsequent processing in accordance with the received PRS and specific downlink signal, thereby improving communication effectiveness.

The above describes the method for configuring a positioning reference signal that is applied to a network device. Hereinafter, a method for receiving a positioning reference signal that is applied to a terminal device according to an embodiment of the present disclosure is described with reference to FIG. 4 and FIG. 5.

As shown in FIG. 4, a method for receiving a positioning reference signal according to an embodiment of the present disclosure is applied to a terminal device, and includes following step:

Step 401: receiving configuration information, where the configuration information is transmitted by a network device based on a spatial quasi co-location QCL relationship between the positioning reference signal PRS and a specific downlink signal, and the configuration information is used to determine a resource occupied by the PRS and the specific downlink signal.

The specific downlink signal includes a downlink system common signal or a system common channel. For example, the specific downlink signal includes one or more of following signals: a channel state information reference signal CSI-RS, a physical downlink shared channel PDSCH, a physical downlink control channel PDCCH and a synchronization signal block SSB.

In the method for receiving the positioning reference signal according to the embodiment of the present disclosure, due to the configuration information received by the terminal device and transmitted by the network device for determining the resource occupied by the PRS and the specific downlink signal, the terminal device may determine whether the PRS and the specific downlink signal are multiplexed on downlink time-domain resources, so as to receive the PRS properly, and further perform positioning of the terminal device according to a received PRS, thereby improving communication effectiveness.

Contents included in the configuration information coming from the network device are described with respect to more specific embodiments below.

In an embodiment, it is assumed that the specific downlink signal includes the CSI-RS. In an example, in a case that there is a spatial QCL relationship between the PRS and the CSI-RS, the configuration information includes: the PRS and the CSI-RS occupy a same orthogonal frequency division multiplexing OFDM symbol.

In specific, that the PRS and the CSI-RS occupy the same OFDM symbol may include: the PRS and the CSI-RS are frequency division multiplexed on different resource elements RE in the same OFDM symbol; or in a case that the PRS and the CSI-RS are transmitted on a same RE in the OFDM symbol, the PRS and the CSI-RS share the same RE.

In another example, in a case that there is no spatial QCL relationship between the PRS and the CSI-RS, the configuration information includes: the PRS and the CSI-RS occupy different OFDM symbols.

The CSI-RS includes one or more of following information: a CSI-RS for tracking, a CSI-RS for physical layer reference signal received power (L1-RSRP) computation, or a CSI-RS for mobility.

In an embodiment, it is assumed that the specific downlink signal includes the PDSCH. In an example, in a case that there is a spatial QCL relationship between the PRS and the PDSCH, the configuration information includes: the PRS and the PDSCH occupy a same orthogonal frequency division multiplexing OFDM symbol, or the PRS and the PDSCH occupy different OFDM symbols.

That the PRS and the PDSCH occupy the same OFDM symbol includes: the PDSCH is rate matched around the PRS, or in a case that the PRS and the PDSCH are transmitted on a same RE in the OFDM symbol, the PDSCH mapped to the RE is punctured by the PRS.

In a case that there is a spatial QCL relationship between the PRS and the PDSCH, that the PRS and the PDSCH occupy different OFDM symbols includes: the PRS and the PDSCH occupy different OFDM symbols in the same slot; or the PRS and the PDSCH occupy OFDM symbols in different slots.

In an example, in a case that there is no spatial QCL relationship between the PRS and the PDSCH, the configuration information includes: the PRS and the PDSCH occupy different OFDM symbols.

In another embodiment, it is assumed that the specific downlink signal includes the PDCCH. In an example, in a case that there is a spatial QCL relationship between the PRS and the PDCCH, the configuration information includes: the PRS and the PDCCH occupy a same orthogonal frequency division multiplexing OFDM symbol, or the PRS and the PDCCH occupy different OFDM symbols.

In a case that there is a spatial QCL relationship between the PRS and the PDCCH, that the PRS and the PDCCH occupy the same OFDM symbol includes: the PDCCH is rate matched around the PRS, or in a case that the PRS and the PDCCH are transmitted on a same RE in the OFDM symbol, the PDCCH mapped to the RE is punctured by the PRS.

In another example, in a case that there is no spatial QCL relationship between the PRS and the PDCCH, the configuration information includes: the PRS and the PDCCH occupy different OFDM symbols.

In another embodiment, it is assumed that the specific downlink signal includes an SSB. In an example, in a case that there is a spatial QCL relationship between the PRS and the SSB, and the PRS and the SSB have a same subcarrier spacing, the configuration information includes: the PRS and the SSB occupy a same orthogonal frequency division multiplexing OFDM symbol, or the PRS and the SSB occupy different OFDM symbols.

That the PRS and the SSB occupy the same OFDM symbol includes one of following manners.

(1) The PRS and the physical broadcast channel PBCH in the SSB occupy resource blocks (RB) at different frequency-domain positions in the OFDM symbol.

(2) In a case that the PRS and the SSB are transmitted on a same RE in the OFDM symbol, the PRS mapped to the RE is punctured by the SSB.

(3) In a case that the PRS and the SSB are transmitted on a same RE in the OFDM symbol, the SSB mapped to the RE is punctured by the PRS.

(4) In a case that the PRS and a physical broadcast channel demodulation reference signal PBCH DMRS in the SSB are transmitted on a same RE in the OFDM symbol, the PRS and the PBCH DMRS share the RE, and in a case that the PRS and an SSB other than the PBCH DMRS are transmitted on a same RE in the OFDM symbol, the PRS mapped to the RE is punctured by the SSB other than the PBCH DMRS.

(5) In a case that the PRS and a physical broadcast channel demodulation reference signal PBCH DMRS in the SSB are transmitted on a same RE in the OFDM symbol, the PRS and the PBCH DMRS share the RE, and in a case that the PRS and an SSB other than the PBCH DMRS are transmitted on a same RE in the OFDM symbol, the SSB other than the PBCH DMRS that is mapped to the RE is punctured by the PRS.

In another example, in a case that there is no spatial QCL relationship between the PRS and the SSB, the configuration information includes: the PRS and the SSB occupy different OFDM symbols.

The above describes resource occupancy configurations of PRS and CSI-RS, PRS and PDSCH, PRS and PDCCH, and PRS and SSB respectively with respect to specific embodiments. The manner of receiving the configuration information by the terminal device is described hereinafter.

In a specific receiving process, the terminal device may receive the configuration information by one or more of following means: (1) receiving the configuration information based on higher layer signaling, e.g., by using an RRC message; (2) receiving the configuration information based on MAC layer signaling; or (3) receiving the configuration information based on DCI.

Certainly, in another embodiment, the aforementioned configuration information may be specified by a protocol. It is understood, in a case that the configuration information is specified by a protocol, the terminal device may not receive the configuration information from the network device. Instead, the terminal device acquires the configuration information by querying a protocol and receives the PRS based on the configuration information.

Figure 5:
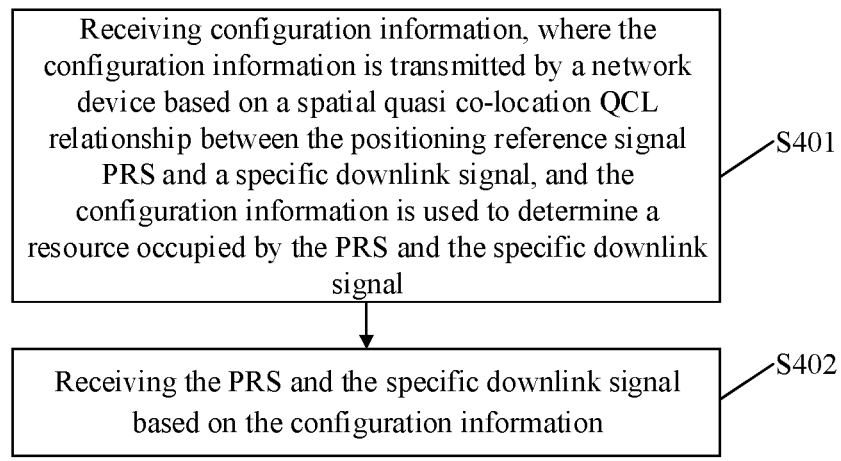
FIG. 5 is a second schematic flow diagram of a method for receiving a positioning reference signal according to an embodiment of the present disclosure.

Optionally, in another embodiment, as shown in FIG. 5, on the basis of the aforementioned step 401, the method for receiving a positioning reference signal according to an embodiment of the present disclosure may further include:

Step 402: receiving the PRS and the specific downlink signal based on the configuration information.

It is understood, after the configuration information is received by the terminal device, subsequently the PRS and the specific downlink signal may be received properly by the terminal device based on the configuration information. In this way, the terminal device may perform subsequent processing in accordance with the received PRS and specific downlink signal, thereby improving communication effectiveness.

Optionally, in another embodiment, having received the PRS configured by the network device, the terminal device may further perform positioning based on the PRS. A brief introduction of the positioning process performed by the terminal device based on the PRS is given below by taking a case in which the PRS is applied in observed time difference of arrival (OTDOA) positioning for example.

As an example, the PRS-based OTDOA positioning process may include:

first, a network device generates a PRS based on the aforementioned method and transmits the PRS to a terminal device, where the network device includes a serving cell of the terminal device and multiple neighboring cells selected from neighboring cells of the terminal device;

second, the terminal device performs a time-domain correlation on a PRS from a neighboring cell and a local PRS, to obtain a delay power spectrum corresponding to each neighboring cell, where the local PRS is a PRS generated by the terminal device based on a PRS generation rule;

third, the terminal device searches a first arriving path of a neighboring cell according to the delay power spectrum corresponding to the neighboring cell, to obtain a time of arrival (TOA) of a PRS transmitted from each neighboring cell to the terminal device;

fourth, the network device determines a reference signal time difference (RSTD) between the serving cell and each neighboring cell based on TOAs corresponding to at least three neighboring cells, to determine the position of the terminal device. In specific, the determining the position of the terminal device may be calculating coordinates of the terminal device.

In the foregoing process, the position of the terminal device is determined according to time differences of arrival (TDOA) among at least three neighboring cells, that is, is determined according to a relative time instead of an absolute time.

Since the method for receiving the positioning reference signal according to an embodiment of the present disclosure corresponds to the method for configuring the positioning reference signal according to an embodiment of the present disclosure, a relative simple description of the method for receiving the positioning reference signal is given in this disclosure. For a relevant description, references may be made to the above description of the method for configuring the positioning reference signal.

A network device and a terminal device according to embodiments of the present disclosure are described in detail below with reference to FIG. 6 to FIG. 9.

Figure 6:
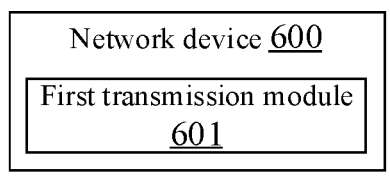
FIG. 6 is a first schematic structural diagram of a network device according to an embodiment of the present disclosure.

FIG. 6 is a schematic structural diagram of a network device according to an embodiment of the present disclosure. As shown in FIG. 6, a network device 600 includes: a first transmission module 601.

The first transmission module 601 is configured to transmit configuration information based on a spatial quasi co-location QCL relationship between a positioning reference signal PRS and a specific downlink signal, where the configuration information is used to determine a resource occupied by the PRS and the specific downlink signal.

The specific downlink signal includes one or more of following signals: a channel state information reference signal CSI-RS, a physical downlink shared channel PDSCH, a physical downlink control channel PDCCH and a synchronization signal block SSB.

In the network device 600 according to the embodiment as shown in FIG. 6, due to the configuration information transmitted by the network device for determining the resource occupied by the PRS and the specific downlink signal, the terminal device may determine whether the PRS and the specific downlink signal are multiplexed on downlink time-domain resources, so as to receive the PRS properly, and further perform positioning of the terminal device according to a received PRS, thereby improving communication effectiveness.

Contents included in the configuration information transmitted by the network device 600 are described with respect to more specific embodiments below.

In an embodiment, it is assumed that the specific downlink signal includes the CSI-RS. In an example, in a case that there is a spatial QCL relationship between the PRS and the CSI-RS, the configuration information includes: the PRS and the CSI-RS occupy a same orthogonal frequency division multiplexing OFDM symbol.

In specific, that the PRS and the CSI-RS occupy the same OFDM symbol may include: the PRS and the CSI-RS are frequency division multiplexed on different resource elements RE in the same OFDM symbol; or in a case that the PRS and the CSI-RS are transmitted on a same RE in the OFDM symbol, the PRS and the CSI-RS share the same RE.

In another example, in a case that there is no spatial QCL relationship between the PRS and the CSI-RS, the configuration information includes: the PRS and the CSI-RS occupy different OFDM symbols.

The CSI-RS includes one or more of following information: a CSI-RS for tracking, a CSI-RS for physical layer reference signal received power L1-RSRP computation, or a CSI-RS for mobility.

In an embodiment, it is assumed that the specific downlink signal includes the PDSCH. In an example, in a case that there is a spatial QCL relationship between the PRS and the PDSCH, the configuration information includes: the PRS and the PDSCH occupy a same orthogonal frequency division multiplexing OFDM symbol, or the PRS and the PDSCH occupy different OFDM symbols.

That the PRS and the PDSCH occupy the same OFDM symbol includes: the PDSCH is rate matched around the PRS, or in a case that the PRS and the PDSCH are transmitted on a same RE in the OFDM symbol, the PDSCH mapped to the RE is punctured by the PRS.

In a case that there is a spatial QCL relationship between the PRS and the PDSCH, that the PRS and the PDSCH occupy different OFDM symbols includes: the PRS and the PDSCH occupy different OFDM symbols in the same slot; or the PRS and the PDSCH occupy OFDM symbols in different slots.

In an example, in a case that there is no spatial QCL relationship between the PRS and the PDSCH, the configuration information includes: the PRS and the PDSCH occupy different OFDM symbols.

In another embodiment, it is assumed that the specific downlink signal includes the PDCCH. In an example, in a case that there is a spatial QCL relationship between the PRS and the PDCCH, the configuration information includes: the PRS and the PDCCH occupy a same orthogonal frequency division multiplexing OFDM symbol, or the PRS and the PDCCH occupy different OFDM symbols.

In a case that there is a spatial QCL relationship between the PRS and the PDCCH, that the PRS and the PDCCH occupy the same OFDM symbol includes: the PDCCH is rate matched around the PRS, or in a case that the PRS and the PDCCH are transmitted on a same RE in the OFDM symbol, the PDCCH mapped to the RE is punctured by the PRS.

In another example, in a case that there is no spatial QCL relationship between the PRS and the PDCCH, the configuration information includes: the PRS and the PDCCH occupy different OFDM symbols.

In another embodiment, it is assumed that the specific downlink signal includes an SSB. In an example, in a case that there is a spatial QCL relationship between the PRS and the SSB, and the PRS and the SSB have a same subcarrier spacing, the configuration information includes: the PRS and the SSB occupy a same orthogonal frequency division multiplexing OFDM symbol, or the PRS and the SSB occupy different OFDM symbols.

That the PRS and the SSB occupy the same OFDM symbol includes one of following manners.

(1) The PRS and the physical broadcast channel PBCH in the SSB occupy resource blocks (RB) at different frequency-domain positions in the OFDM symbol.

(2) In a case that the PRS and the SSB are transmitted on a same RE in the OFDM symbol, the PRS mapped to the RE is punctured by the SSB.

(3) In a case that the PRS and the SSB are transmitted on a same RE in the OFDM symbol, the SSB mapped to the RE is punctured by the PRS.

(4) In a case that the PRS and a physical broadcast channel demodulation reference signal PBCH DMRS in the SSB are transmitted on a same RE in the OFDM symbol, the PRS and the PBCH DMRS share the RE, and in a case that the PRS and an SSB other than the PBCH DMRS are transmitted on a same RE in the OFDM symbol, the PRS mapped to the RE is punctured by the SSB other than the PBCH DMRS.

(5) In a case that the PRS and a physical broadcast channel demodulation reference signal PBCH DMRS in the SSB are transmitted on a same RE in the OFDM symbol, the PRS and the PBCH DMRS share the RE, and in a case that the PRS and an SSB other than the PBCH DMRS are transmitted on a same RE in the OFDM symbol, the SSB other than the PBCH DMRS that is mapped to the RE is punctured by the PRS.

In another example, in a case that there is no spatial QCL relationship between the PRS and the SSB, the configuration information includes: the PRS and the SSB occupy different OFDM symbols.

The above describes resource occupancy configurations of PRS and CSI-RS, PRS and PDSCH, PRS and PDCCH, and PRS and SSB respectively with respect to specific embodiments. A manner in which the network device 600 transmits the configuration information is described below.

In a specific transmission process, the network device may transmit the configuration information by one or more of following means: (1) transmitting the configuration information based on higher layer signaling, e.g., by using an RRC message; (2) transmitting the configuration information based on MAC layer signaling; or (3) transmitting the configuration information based on DCI.

Certainly, in another embodiment, the aforementioned configuration information may be specified by a protocol. It is understood, in a case that the configuration information is specified by a protocol, the network device may not transmit the configuration information to a terminal device. Instead, the terminal device acquires the configuration information by querying a protocol and receives the PRS based on the configuration information.

Figure 7:
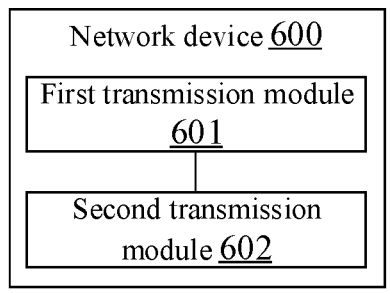
FIG. 7 is a second schematic structural diagram of a network device according to an embodiment of the present disclosure.

Optionally, in another embodiment, as shown in FIG. 7, the network device 600 according to the embodiment of the present disclosure may further includes: a second transmission module 602, configured to transmit the PRS and the specific downlink signal based on the configuration information.

It is understood, after the configuration information is transmitted by the network device 600 to the terminal device, the PRS and the specific downlink signal are subsequently transmitted to the terminal device based on the configuration information. In this way, the terminal device may receive the PRS and the specific downlink signal properly and perform subsequent processing in accordance with the received PRS and specific downlink signal, thereby improving communication effectiveness.

The foregoing network device 600 as shown in FIG. 6 and FIG. 7 may be configured to implement various embodiments of the foregoing method for configuring a positioning reference signal as shown in FIG. 1 to FIG. 3, and for relevant description, references may be made to the embodiments of the foregoing method.

Figure 8:
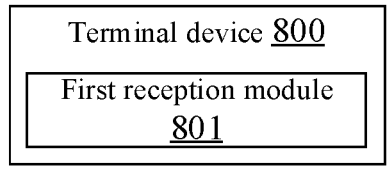
FIG. 8 is a first schematic structural diagram of a terminal device according to an embodiment of the present disclosure.

As shown in FIG. 8, an embodiment of the present disclosure further provides a terminal device 800. The terminal device 800 may include: a first reception module 801.

The first reception module 801 is configured to receive configuration information, where the configuration information is transmitted by a network device based on a spatial quasi co-location QCL relationship between a positioning reference signal PRS and a specific downlink signal, and the configuration information is used to determine a resource occupied by the PRS and the specific downlink signal.

The specific downlink signal includes one or more of following signals: a channel state information reference signal CSI-RS, a physical downlink shared channel PDSCH, a physical downlink control channel PDCCH and a synchronization signal block SSB.

In the terminal device 800 according to the embodiment as shown in FIG. 8, due to the received configuration information transmitted by the network device for determining the resource occupied by the PRS and the specific downlink signal, the terminal device may determine whether the PRS and the specific downlink signal are multiplexed on downlink time-domain resources, so as to receive the PRS properly, and further perform positioning of the terminal device according to a received PRS, thereby improving communication effectiveness.

Contents included in the configuration information coming from the network device are described with respect to more specific embodiments below.

In an embodiment, it is assumed that the specific downlink signal includes the CSI-RS. In an example, in a case that there is a spatial QCL relationship between the PRS and the CSI-RS, the configuration information includes: the PRS and the CSI-RS occupy a same orthogonal frequency division multiplexing OFDM symbol.

In specific, that the PRS and the CSI-RS occupy the same OFDM symbol may include: the PRS and the CSI-RS are frequency division multiplexed on different resource elements RE in the same OFDM symbol; or in a case that the PRS and the CSI-RS are transmitted on a same RE in the OFDM symbol, the PRS and the CSI-RS share the same RE.

In another example, in a case that there is no spatial QCL relationship between the PRS and the CSI-RS, the configuration information includes: the PRS and the CSI-RS occupy different OFDM symbols.

The CSI-RS includes one or more of following information: a CSI-RS for tracking, a CSI-RS for physical layer reference signal received power L1-RSRP computation, or a CSI-RS for mobility.

In an embodiment, it is assumed that the specific downlink signal includes the PDSCH. In an example, in a case that there is a spatial QCL relationship between the PRS and the PDSCH, the configuration information includes: the PRS and the PDSCH occupy a same orthogonal frequency division multiplexing OFDM symbol, or the PRS and the PDSCH occupy different OFDM symbols.

That the PRS and the PDSCH occupy the same OFDM symbol includes: the PDSCH is rate matched around the PRS, or in a case that the PRS and the PDSCH are transmitted on a same RE in the OFDM symbol, the PDSCH mapped to the RE is punctured by the PRS.

In a case that there is a spatial QCL relationship between the PRS and the PDSCH, that the PRS and the PDSCH occupy different OFDM symbols includes: the PRS and the PDSCH occupy different OFDM symbols in the same slot; or the PRS and the PDSCH occupy OFDM symbols in different slots.

In an example, in a case that there is no spatial QCL relationship between the PRS and the PDSCH, the configuration information includes: the PRS and the PDSCH occupy different OFDM symbols.

In another embodiment, it is assumed that the specific downlink signal includes the PDCCH. In an example, in a case that there is a spatial QCL relationship between the PRS and the PDCCH, the configuration information includes: the PRS and the PDCCH occupy a same orthogonal frequency division multiplexing OFDM symbol, or the PRS and the PDCCH occupy different OFDM symbols.

In a case that there is a spatial QCL relationship between the PRS and the PDCCH, that the PRS and the PDCCH occupy the same OFDM symbol includes: the PDCCH is rate matched around the PRS, or in a case that the PRS and the PDCCH are transmitted on a same RE in the OFDM symbol, the PDCCH mapped to the RE is punctured by the PRS.

In another example, in a case that there is no spatial QCL relationship between the PRS and the PDCCH, the configuration information includes: the PRS and the PDCCH occupy different OFDM symbols.

In another embodiment, it is assumed that the specific downlink signal includes an SSB. In an example, in a case that there is a spatial QCL relationship between the PRS and the SSB, and the PRS and the SSB have a same subcarrier spacing, the configuration information includes: the PRS and the SSB occupy a same orthogonal frequency division multiplexing OFDM symbol, or the PRS and the SSB occupy different OFDM symbols.

That the PRS and the SSB occupy the same OFDM symbol includes one of following manners.

(1) The PRS and the physical broadcast channel PBCH in the SSB occupy resource blocks RB at different frequency-domain positions in the OFDM symbol.

(2) In a case that the PRS and the SSB are transmitted on a same RE in the OFDM symbol, the PRS mapped to the RE is punctured by the SSB.

(3) In a case that the PRS and the SSB are transmitted on a same RE in the OFDM symbol, the SSB mapped to the RE is punctured by the PRS.

(4) In a case that the PRS and a physical broadcast channel demodulation reference signal PBCH DMRS in the SSB are transmitted on a same RE in the OFDM symbol, the PRS and the PBCH DMRS share the RE, and in a case that the PRS and an SSB other than the PBCH DMRS are transmitted on a same RE in the OFDM symbol, the PRS mapped to the RE is punctured by the SSB other than the PBCH DMRS.

(5) In a case that the PRS and a physical broadcast channel demodulation reference signal PBCH DMRS in the SSB are transmitted on a same RE in the OFDM symbol, the PRS and the PBCH DMRS share the RE, and in a case that the PRS and an SSB other than the PBCH DMRS are transmitted on a same RE in the OFDM symbol, the SSB other than the PBCH DMRS that is mapped to the RE is punctured by the PRS.

In another example, in a case that there is no spatial QCL relationship between the PRS and the SSB, the configuration information includes: the PRS and the SSB occupy different OFDM symbols.

The above describes resource occupancy configurations of PRS and CSI-RS, PRS and PDSCH, PRS and PDCCH, and PRS and SSB respectively with respect to specific embodiments. A manner in which the terminal device 800 receives the configuration information is described hereinafter.

In a specific receiving process, the terminal device 800 may receive the configuration information by one or more of following means: (1) receiving the configuration information based on higher layer signaling, e.g., by using an RRC message; (2) receiving the configuration information based on MAC layer signaling; or (3) receiving the configuration information based on DCI.

Certainly, in another embodiment, the aforementioned configuration information may be specified by a protocol. It is understood, in a case that the configuration information is specified by a protocol, the terminal device may not receive the configuration information from the network device. Instead, the terminal device acquires the configuration information by querying a protocol and receives the PRS based on the configuration information.

Figure 9:
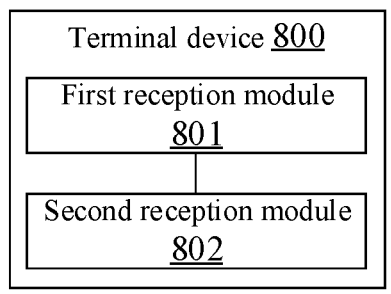
FIG. 9 is a second schematic structural diagram of a terminal device according to an embodiment of the present disclosure.

Optionally, in another embodiment, as shown in FIG. 9, the terminal device 800 according to the embodiment of the present disclosure may further include: a second reception module 802, configured to receive the PRS and the specific downlink signal based on the configuration information.

It is understood, after the configuration information is received by the terminal device 800, subsequently the PRS and the specific downlink signal may be received properly based on the configuration information. In this way, the terminal device 800 may perform subsequent processing in accordance with the received PRS and specific downlink signal, thereby improving communication effectiveness.

The foregoing terminal device 800 as shown in FIG. 8 and FIG. 9 may be configured to implement various embodiments of the foregoing method for receiving a positioning reference signal as shown in FIG. 4 and FIG. 5, and for relevant description, references may be made to the embodiments of the foregoing method.

Figure 10:
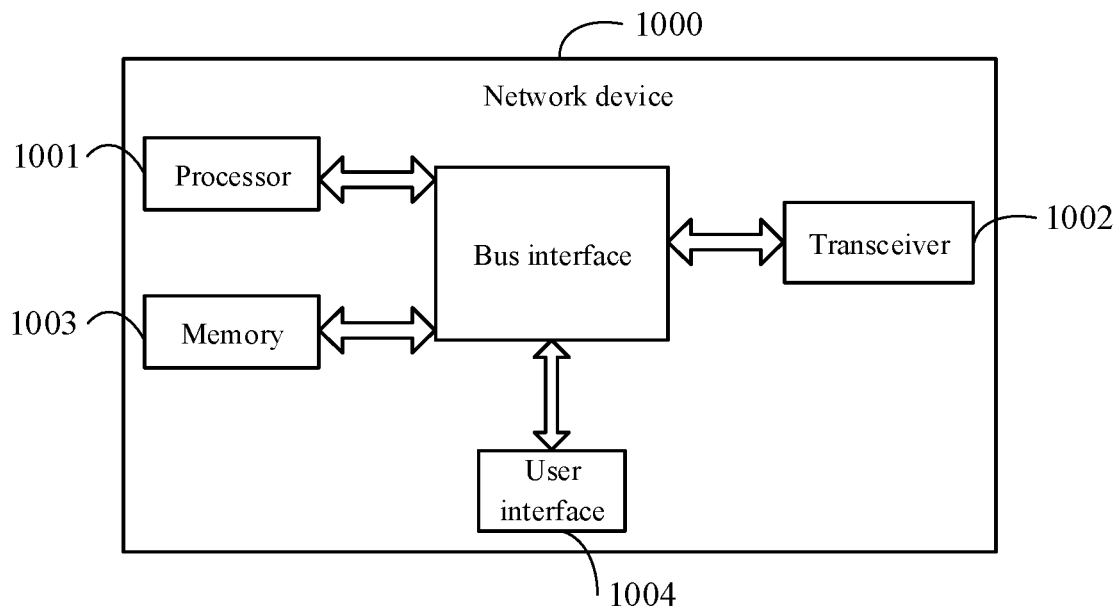
FIG. 10 is a third schematic structural diagram of a network device according to an embodiment of the present disclosure.

Referring to FIG. 10, a structural diagram of a network device to which embodiments of the present disclosure are applicable is illustrated. The network device may implement details of the foregoing method for configuring a positioning reference signal and achieve the same effects. As shown in FIG. 10, the network device 1000 includes: a processor 1001, a transceiver 1002, a memory 1003, a user interface 1004 and a bus interface.

In an embodiment of the present disclosure, the network device 1000 further includes: a computer program stored in the memory 1003 and configured to be executed by the processor 1001. The processor 1001 is configured to execute the computer program to implement various processes of the foregoing method for configuring a positioning reference signal and achieve the same technical effects. To avoid repetition, a detail description is omitted herein.

In FIG. 10, a bus architecture may include any number of interconnected buses and bridges, and connects various circuits including one or more processors represented by the processor 1001 and a memory represented by the memory 1003. The bus architecture may also connect various other circuits such as peripherals, voltage regulators and power management circuits, which is well known in the art. Therefore, a detailed description thereof is omitted herein. The bus interface provides interfaces. The transceiver 1002 may be multiple elements, such as a transmitter and a receiver, to provide units for communicating with various other apparatuses on the transmission medium. For difference terminal devices, the user interface 1004 may be an interface capable of connecting to other necessary devices externally or internally. The connected device includes, but is not limited to: a keypad, a display, a loudspeaker, a microphone, a joystick, etc.

The processor 1001 is responsible for supervising the bus architecture and normal operation and the memory 1003 may store the data being used by the processor 1001 during operation.

Figure 11:
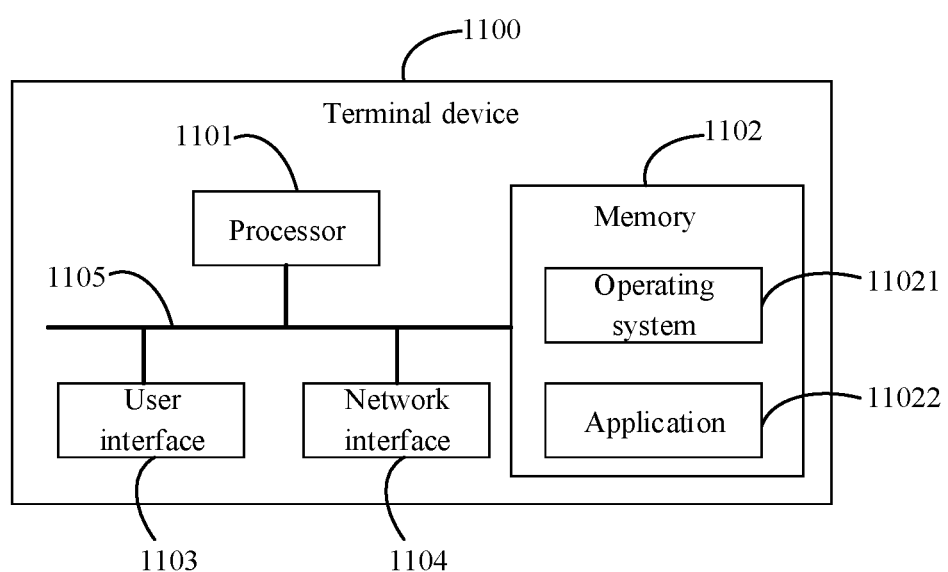
FIG. 11 is a third schematic structural diagram of a terminal device according to an embodiment of the present disclosure.

FIG. 11 is a schematic structural diagram of a terminal device according to another embodiment of the present disclosure. The terminal device 1100 as shown in FIG. 11 includes: at least one processor 1101, a memory 1102, at least one network interface 1104, and a user interface 1103. The various components in the terminal device 1100 are coupled together by a bus system 1105. It may be understood that the bus system 1105 is configured to implement connection and communication among these components. The bus system 1105 further includes a power bus, a control bus, and a status signal bus in addition to a data bus. However, for clarity of description, various buses in FIG. 11 are all labeled as the bus system 1105.

The user interface 1103 may include a display, a keyboard or a point-and-click device (for example, a mouse, a trackball (trackball), a touch pad, a touch screen, or the like).

It may be understood that the memory 1102 in embodiments of the present disclosure may be a volatile memory or a nonvolatile memory, or may include both a volatile memory and a nonvolatile memory. The nonvolatile memory may be a read-only memory (ROM), a programmable ROM (PROM), an erasable programmable PROM (EPROM), an electrically EPROM (EEPROM) or a flash memory. The volatile memory may be a random access memory (RAM), which is used as an external cache. By way of example rather than limitation, many forms of RAMs such as a static RAM (SRAM), a dynamic RAM (DRAM), a synchronous DRAM (SDRAM), a double data rate SDRAM (DDRS-DRAM), an enhanced SDRAM (ESDRAM), a synch link DRAM (SLDRAM), and a direct Rambus RAM (DRRAM) may be used. The memory 1102 in the system and method described in embodiments of the present disclosure is intended to include, but is not limited to, these and any other appropriate types of memories.

In some implementations, the memory 1102 stores executable modules or data structures, or a subset thereof, or an extended set thereof, for example, an operating system 11021 and an application 11022.

The operating system 11021 includes various system programs, such as a framework layer program, a core library layer program, and a driver layer program, to implement various basic services and process a hardware-based task. The application 11022 includes various applications such as a media player (Media Player) or a browser (Browser), to implement various application services. A program for implementing the method provided in embodiments of the present disclosure may be included in the application 11022.

In embodiments of the present disclosure, the terminal device 1100 further includes a computer program stored in the memory 1102 and configured to be executed by the processor 1101. The processor 1101 is configured to execute the computer program to implement various processes of the foregoing method for receiving a positioning reference signal, and the same technical effects may be achieved. To avoid repetition, a detailed description thereof is omitted herein.

The foregoing method disclosed in embodiments of the present disclosure may be applied to the processor 1101 or implemented by the processor 1101. The processor 1101 may be an integrated circuit chip having a signal processing capability. During implementation, the steps in the foregoing method may be accomplished by hardware integrated logic circuits or instructions in a software form in the processor 1101. The processor 1101 may be a general-purpose processor, a digital signal processor (DSP), an application specific integrated circuit (ASIC), a field programmable gate array (FPGA) or other programmable logic device, discrete gate or transistor logic device, a discrete hardware component, that can implement or execute the methods, steps, and logic block diagrams disclosed in embodiments of the present disclosure. The general-purpose processor may be a microprocessor or the processor may be any conventional processor or the like. The steps in the method disclosed with reference to embodiments of the present disclosure may be directly performed and accomplished by a hardware decoding processor, or performed and accomplished by a combination of hardware and software modules in a decoding processor. The software modules may reside in a computer-readable storage medium well-established in the art, such as a random access memory, a flash memory, a readable-only memory, a programmable readable-only memory or an electrically erasable programmable memory or a register. A computer-readable storage medium is located in the memory 1102. The processor 1101 reads information from the memory 1102 and accomplishes the steps in the foregoing method using hardware of the processor 1101. Specifically, a computer program is stored in the computer-readable storage medium. The computer program is configured to be executed by the processor 1101 to implement the steps in the embodiments of the foregoing method for receiving a positioning reference signal.

It may be understood that these embodiments described in this disclosure may be implemented by hardware, software, firmware, middleware, microcode or a combination thereof. For hardware implementation, a processing unit may be implemented in one or more application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, other electronic unit configured to perform the functions in the present disclosure or a combination thereof.

For a software implementation, the techniques in embodiments of the present disclosure may be implemented by modules (for example, processes or functions) performing the functions described in embodiments of the present disclosure. Software codes may be stored in a memory and executed by a processor. The memory may be implemented internal or external to a processor.

An embodiment of the present disclosure further provides a computer readable storage medium storing therein a computer program. The computer program is configured to be executed by a processor to implement various processes of embodiments of the foregoing method for configuring a positioning reference signal or the foregoing method for receiving a positioning reference signal, and the same technical effects may be achieved. To avoid repetition, a detailed description thereof is omitted herein. The computer readable storage medium is for example a read-only memory (ROM), a random access memory (RAM), a magnetic disk, an optical disc or the like.

An embodiment of the present disclosure further provides computer program product including instructions. When a computer executes the instructions of the computer program product, the computer implements the foregoing method for configuring a positioning reference signal or the foregoing method for receiving a positioning reference signal. Specifically, the computer program product may be run on the foregoing network device.

Those of ordinary skill in the art will recognize that, the units and algorithm steps of the various embodiments described above, may be implemented by electronic hardware, or by a combination of computer software and electronic hardware. Whether these functions are implemented by hardware or software depends on the specific application and design constraints of the solution. A skilled artisan may use different methods to implement the described functions for each particular application, but such implementations are not to be considered as departing from the scope of the present disclosure.

The skilled person should appreciate that, for the sake of easiness and conciseness of description, the specific operating processes of the aforementioned systems, devices and units may be understood by referring to the corresponding processes of the foregoing methodology embodiment, and a repeated description thereof is omitted herein.

It should be appreciated that the device and method disclosed in the embodiments provided by this application may be implemented by other means. For example, the aforementioned device embodiment is merely illustrative, e.g., the partition of the unit is merely a logic functional partition, and other methods of partition may be implemented in practice, such as multiple units or components may be combined or integrated into another system, or some features may be ignored or not performed. Furthermore, the shown or discussed mutual coupling or direct coupling or communication connection can be achieved by indirect coupling or communication connection of some interfaces, devices or units in electric, mechanical or other ways.

The units described as separate components may be or not be physically separated, and the components displayed as a unit may or may not be physical units, that is, may be located in one place, or may be distributed over a plurality of network units. Some or all of the units may be selected according to actual needs to realize the object of the present embodiment.

Additionally, the functional units in the various embodiments of the present disclosure may be integrated in one processing unit, or each unit may be physically present alone, or two or more units may be integrated in one unit.

If the function is implemented in the form of a software functional unit, and sold or used as a standalone product, the function may be stored in a computer-readable storage medium. Based on this understanding, essence of the technical solution of the antenna multiplexing of the present disclosure, or the part contributing to the prior art, or part of the technical solution, can be embodied in the form of a computer software product. The computer software product is stored in a storage media, and the computer software product includes a number of instructions to enable a computer device (which may be a personal computer, server, or network device, etc.) to perform all or part of the steps of the method described in the various embodiments of the present disclosure. The storage medium includes a USB disk, a removable hard disk, a read-only memory (ROM), a random access memory (RAM), a magnetic disk, an optical disc, and other medium which can store program code.

The aforementioned are merely specific implementations of the present disclosure, but the scope of the disclosure is by no means limited thereto. Any modifications or replacements that would easily occurred to those skilled in the art, without departing from the technical scope disclosed in the disclosure, should be encompassed in the scope of the present disclosure. Therefore, the scope of the present disclosure is to be determined by the scope of the claims.

What is claimed is:

1. A network device, comprising a memory, a processor and a wireless communication program stored in the memory and configured to be executed by the processor, wherein the processor is configured to execute the wireless communication program to implement:

transmitting configuration information based on a spatial quasi co-location (QCL) relationship between the positioning reference signal (PRS) and a specific downlink signal, wherein the configuration information is used to determine a resource occupied by the PRS and the specific downlink signal;

wherein the specific downlink signal comprises one or more of following signals: a channel state information reference signal (CSI-RS), a physical downlink shared channel (PDSCH), a physical downlink control channel (PDCCH) and a synchronization signal block (SSB);

wherein, in a case that the specific downlink signal comprises the SSB and there is a spatial QCL relationship between the PRS and the SSB, the configuration information comprises: the PRS and the SSB occupy a same orthogonal frequency division multiplexing (OFDM) symbol; or, the PRS and the SSB occupy different QFDM symbols;

wherein, that the PRS and the SSB occupy the same OFDM symbol comprises one of following manners;

in the same OFDM symbol, a frequency domain position occupied by the PRS is on resource blocks (RBs) external to RBs occupied by the physical broadcast channel (PBCH) in the SSB;

in a case that the PRS and the SSB are transmitted on a same resource element (RE) in the same OFDM symbol, the PRS mapped to the RE is punctured by the SSB;

in a case that the PRS and the SSB are transmitted on a same resource element (RE) in the same OFDM symbol, the SSB mapped to the RE is punctured by the PRS;

in a case that the PRS and a physical broadcast channel demodulation reference signal (PBCH DMRS) in the SSB are transmitted on a same resource element (RE) in the same OFDM symbol, the PRS and the PBCH DMRS share the RE, and in a case that the PRS and an SSB other than the PBCH DMRS are transmitted on a same resource element (RE) in the OFDM symbol, the PRS mapped to the RE is punctured by the SSB other than the PBCH DMRS; or in a case that the PRS and a physical broadcast channel demodulation reference signal (PBCH DMRS) in the SSB are transmitted on a same resource element (RE) in the same OFDM symbol, the PRS and the PBCH DMRS share the RE, and in a case that the PRS and an SSB other than the PBCH DMRS are transmitted on a same RE in the OFDM symbol, the SSB other than the PBCH DMRS that is mapped to the RE is punctured by the PRS.

2. The network device according to claim 1, wherein, in a case that the specific downlink signal comprises the SSB and there is no spatial QCL relationship between the PRS and the SSB, the configuration information comprises: the PRS and the SSB occupy different OFDM symbols.

3. The network device according to claim 1, wherein, in a case that the PRS and the SSB occupy the same OFDM symbol, the PRS and the SSB have a same subcarrier spacing.

4. The network device according to claim 1, wherein the processor is configured to execute the wireless communication program to implement:
transmitting the PRS and the specific downlink signal based on the configuration information.

5. The network device according to claim 1, wherein the configuration information meets at least one of the following:
in a case that the specific downlink signal comprises the CSI-RS and there is a spatial QCL relationship between the PRS and the CSI-RS, the configuration information comprises: the PRS and the CSI-RS occupy a same orthogonal frequency division multiplexing (OFDM) symbol;
in a case that the specific downlink signal comprises the CSI-RS and there is no spatial QCL relationship between the PRS and the CSI-RS, the configuration information comprises: the PRS and the CSI-RS occupy different OFDM symbols;
in a case that the specific downlink signal comprises the PDSCH and there is a spatial QCL relationship between the PRS and the PDSCH, the configuration information comprises: the PRS and the PDSCH occupy a same orthogonal frequency division multiplexing (OFDM) symbol; or, the PRS and the PDSCH occupy different OFDM symbols;
in a case that the specific downlink signal comprises the PDSCH and there is no spatial QCL relationship between the PRS and the PDSCH, the configuration information comprises: the PRS and the PDSCH occupy different OFDM symbols;
in a case that the specific downlink signal comprises the PDCCH and there is a spatial QCL relationship between the PRS and the PDCCH, the configuration information comprises: the PRS and the PDCCH occupy a same orthogonal frequency division multiplexing (OFDM) symbol; or, the PRS and the PDCCH occupy different OFDM symbols;
in a case that the specific downlink signal comprises the PDCCH and there is no spatial QCL relationship between the PRS and the PDCCH, the configuration information comprises: the PRS and the PDCCH occupy different OFDM symbols.

6. The network device according to claim 5, wherein,
that the PRS and the CSI-RS occupy the same OFDM symbol comprises:
the PRS and the CSI-RS are frequency division multiplexed on different resource elements RE in the same OFDM symbol; or in a case that the PRS and the CSI-RS are transmitted on a same RE in the OFDM symbol, the PRS and the CSI-RS share the same RE;
or, that the PRS and the PDSCH occupy the same OFDM symbol comprises:
the PDSCH is rate matched around the PRS, or in a case that the PRS and the PDSCH are transmitted on a same RE in the OFDM symbol, the PDSCH mapped to the RE is punctured by the PRS;
or, in a case that there is a spatial QCL relationship between the PRS and the PDSCH, that the PRS and the PDSCH occupy different OFDM symbols comprises:
the PRS and the PDSCH occupy different OFDM symbols in a same slot; or, the PRS and the PDSCH occupy OFDM symbols in different slots;
or, that the PRS and the PDCCH occupy the same OFDM symbol comprises:
the PDCCH is rate matched around the PRS, or in a case that the PRS and the PDCCH are transmitted on a same RE in the OFDM symbol, the PDCCH mapped to the RE is punctured by the PRS.

7. The network device according to claim 1, wherein there are the following types of QCL relationships:
QCL type A: {a Doppler shift, a Doppler spread, an average delay, a delay spread};
QCL type B: {a Doppler shift, a Doppler spread};
QCL type C: {an average delay, a Doppler shift};
QCL type D: {a spatial Rx parameter}.

8. A method for receiving a positioning reference signal, applied to a terminal device, comprising:
receiving configuration information, wherein the configuration information is transmitted by a network device based on a spatial quasi co-location (QCL) relationship between the positioning reference signal (PRS) and a specific downlink signal, and the configuration information is used to determine a resource occupied by the PRS and the specific downlink signal;
wherein the specific downlink signal comprises one or more of following signals: a channel state information reference signal (CSI-RS), a physical downlink shared channel (PDSCH), a physical downlink control channel (PDCCH) and a synchronization signal block (SSB);
wherein, in a case that the specific downlink signal comprises the SSB and there is a spatial QCL relationship between the PRS and the SSB, the configuration information comprises: the PRS and the SSB occupy a same orthogonal frequency division multiplexing (OFDM) symbol; or, the PRS and the SSB occupy different OFDM symbols;
wherein, that the PRS and the SSB occupy the same OFDM symbol comprises one of following manners:
in the same OFDM symbol, a frequency domain position occupied by the PRS is on resource blocks (RBs) external to RBs occupied by the physical broadcast channel (PBCHD) in the SSB;
in a case that the PRS and the SSB are transmitted on a same resource element (RE) in the same OFDM symbol, the PRS mapped to the RE is punctured by the SSB;
in a case that the PRS and the SSB are transmitted on a same resource element (RE) in the same OFDM symbol, the SSB mapped to the RE is punctured by the PRS;
in a case that the PRS and a physical broadcast channel demodulation reference signal (PBCH DMRS) in the SSB are transmitted on a same resource element (RE) in the same OFDM symbol, the PRS and the PBCH DMRS share the RE, and in a case that the PRS and an SSB other than the PBCH DMRS are transmitted on a same resource element (RE) in the OFDM symbol, the PRS mapped to the RE is punctured by the SSB other than the PBCH DMRS; or
in a case that the PRS and a physical broadcast channel demodulation reference signal (PBCH DMRS) in the SSB are transmitted on a same resource element (RE) in the same OFDM symbol, the PRS and the PBCH DMRS share the RE, and in a case that the PRS and an SSB other than the PBCH DMRS are transmitted on a same resource element (RE) in the same OFDM symbol, the SSB other than the PBCH DMRS that is mapped to the RE is punctured by the PRS.

9. The method according to claim 8, wherein,
in a case that the specific downlink signal comprises the SSB and there is no spatial QCL relationship between the PRS and the SSB, the configuration information comprises: the PRS and the SSB occupy different OFDM symbols.

10. The method according to claim 9, wherein, in a case that there is no spatial QCL relationship between the PRS and the SSB, a terminal only receives the SSB.

11. The method according to claim 8, wherein, in a case that the PRS and the SSB occupy the same OFDM symbol, the PRS and the SSB have a same subcarrier spacing.

12. The method according to claim 8, wherein,
the configuration information is received by one or more of following means:
higher layer signaling;
MAC layer signaling; or
downlink control information (DCI).

13. The method according to claim 8, further comprising: receiving the PRS and the specific downlink signal based on the configuration information.

14. The method according to claim 8, wherein, the configuration information meets at least one of the following:
in a case that the specific downlink signal comprises the CSI-RS and there is a spatial QCL relationship between the PRS and the CSI-RS, the configuration information comprises: the PRS and the CSI-RS occupy a same orthogonal frequency division multiplexing (OFDM) symbol;
in a case that the specific downlink signal comprises the CSI-RS and there is no spatial QCL relationship between the PRS and the CSI-RS, the configuration information comprises: the PRS and the CSI-RS occupy different OFDM symbols;
in a case that the specific downlink signal comprises the PDSCH and there is a spatial QCL relationship between the PRS and the PDSCH, the configuration information comprises: the PRS and the PDSCH occupy a same orthogonal frequency division multiplexing (OFDM) symbol; or, the PRS and the PDSCH occupy different OFDM symbols;
in a case that the specific downlink signal comprises the PDSCH and there is no spatial QCL relationship between the PRS and the PDSCH, the configuration information comprises: the PRS and the PDSCH occupy different OFDM symbols;
in a case that the specific downlink signal comprises the PDCCH and there is a spatial QCL relationship between the PRS and the PDCCH, the configuration information comprises: the PRS and the PDCCH occupy a same orthogonal frequency division multiplexing (OFDM) symbol; or, the PRS and the PDCCH occupy different OFDM symbols;
in a case that the specific downlink signal comprises the PDCCH and there is no spatial QCL relationship between the PRS and the PDCCH, the configuration information comprises: the PRS and the PDCCH occupy different OFDM symbols.

15. The method according to claim 14, wherein,
wherein, that the PRS and the CSI-RS occupy the same OFDM symbol comprises:
the PRS and the CSI-RS are frequency division multiplexed on different resource elements RE in the same OFDM symbol; or in a case that the PRS and the CSI-RS are transmitted on a same RE in the OFDM symbol, the PRS and the CSI-RS share the same RE;
or, that the PRS and the PDSCH occupy the same OFDM symbol comprises:
the PDSCH is rate matched around the PRS, or in a case that the PRS and the PDSCH are transmitted on a same RE in the OFDM symbol, the PDSCH mapped to the RE is punctured by the PRS;
or, in a case that there is a spatial QCL relationship between the PRS and the PDSCH, that the PRS and the PDSCH occupy different OFDM symbols comprises:
the PRS and the PDSCH occupy different OFDM symbols in a same slot; or, the PRS and the PDSCH occupy OFDM symbols in different slots;
or, that the PRS and the PDCCH occupy the same OFDM symbol comprises:
the PDCCH is rate matched around the PRS, or in a case that the PRS and the PDCCH are transmitted on a same RE in the OFDM symbol, the PDCCH mapped to the RE is punctured by the PRS.

16. The method according to claim 8, wherein there are the following types of QCL relationships:
QCL type A: {a Doppler shift, a Doppler spread, an average delay, a delay spread};
QCL type B: {a Doppler shift, a Doppler spread};
QCL type C: {an average delay, a Doppler shift};
QCL type D: {a spatial Rx parameter}.

17. A terminal device, comprising a memory, a processor and a wireless communication program stored in the memory and configured to be executed by the processor, wherein the processor is configured to execute the wireless communication program to implement:
receiving configuration information, wherein the configuration information is transmitted by a network device based on a spatial quasi co-location (QCL) relationship between the positioning reference signal (PRS) and a specific downlink signal, and the configuration information is used to determine a resource occupied by the PRS and the specific downlink signal;
wherein the specific downlink signal comprises one or more of following signals: a channel state information reference signal (CSI-RS), a physical downlink shared channel (PDSCH), a physical downlink control channel (PDCCH) and a synchronization signal block (SSB);
wherein, in a case that the specific downlink signal comprises the SSB and there is a spatial QCL relationship between the PRS and the SSB, the configuration information comprises: the PRS and the SSB occupy a same orthogonal frequency division multiplexing (OFDM) symbol; or, the PRS and the SSB occupy different OFDM symbols;
wherein, that the PRS and the SSB occupy the same OFDM symbol comprises one of following manners:
in the same OFDM symbol, a frequency domain position occupied by the PRS is on resource blocks (RBs) external to RBs occupied by the physical broadcast channel (PBCHD) in the SSB;
in a case that the PRS and the SSB are transmitted on a same resource element (RE) in the same OFDM symbol, the PRS mapped to the RE is punctured by the SSB;
in a case that the PRS and the SSB are transmitted on a same resource element (RE) in the same OFDM symbol, the SSB mapped to the RE is punctured by the PRS;
in a case that the PRS and a physical broadcast channel demodulation reference signal (PBCH DMRS) in the SSB are transmitted on a same resource element (RE) in the same OFDM symbol, the PRS and the PBCH DMRS share the RE, and in a case that the PRS and an SSB other than the PBCH DMRS are transmitted on a same resource element (RE) in the OFDM symbol, the PRS mapped to the RE is punctured by the SSB other than the PBCH DMRS; or in a case that the PRS and a physical broadcast channel demodulation reference signal (PBCH DMRS) in the SSB are transmitted on a same resource element (RE) in the same OFDM symbol, the PRS and the PBCH DMRS share the RE, and in a case that the PRS and an SSB other than the PBCH DMRS are transmitted on a same resource element (RE) in the same OFDM symbol, the SSB other than the PBCH DMRS that is mapped to the RE is punctured by the PRS.

18. The terminal device according to claim 17, wherein,
in a case that the specific downlink signal comprises the SSB and there is no spatial QCL relationship between the PRS and the SSB, the configuration information comprises: the PRS and the SSB occupy different OFDM symbols.

19. The terminal device according to claim 17, wherein, in a case that the PRS and the SSB occupy the same OFDM symbol, the PRS and the SSB have a same subcarrier spacing.

20. The terminal device according to claim 17, wherein there are the following types of QCL relationships:
QCL type A: {a Doppler shift, a Doppler spread, an average delay, a delay spread};
QCL type B: {a Doppler shift, a Doppler spread};
QCL type C: {an average delay, a Doppler shift};
QCL type D: {a spatial Rx parameter}.

* * * * *